United States Patent
Khan (10) Patent No.: US 11,055,693 B2
(45) Date of Patent: Jul. 6, 2021

(54) METHODS, SYSTEMS AND COMPUTER READABLE MEDIA FOR ISSUING AND REDEEMING CO-BRANDED ELECTRONIC CERTIFICATES

(75) Inventor: Mohammad Khan, San Jose, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 770 days.

(21) Appl. No.: 13/250,400

(22) Filed: Sep. 30, 2011

(65) Prior Publication Data
US 2012/0084132 A1    Apr. 5, 2012

Related U.S. Application Data

(60) Provisional application No. 61/388,534, filed on Sep. 30, 2010.

(51) Int. Cl.
*G06Q 20/32* (2012.01)
*G06Q 30/02* (2012.01)

(52) U.S. Cl.
CPC ..... *G06Q 20/3278* (2013.01); *G06Q 30/0225* (2013.01)

(58) Field of Classification Search
None
See application file for complete search history.

(56) References Cited

U.S. PATENT DOCUMENTS

| | | | |
|---|---|---|---|
| 9,299,087 B1* | 3/2016 | Barnes | G06Q 30/0238 |
| 2004/0122736 A1* | 6/2004 | Strock | G06Q 30/02 |
| | | | 705/14.31 |
| 2004/0243519 A1* | 12/2004 | Perttila | G06Q 30/02 |
| | | | 705/75 |
| 2006/0074784 A1* | 4/2006 | Brown | 705/35 |
| 2009/0036103 A1* | 2/2009 | Byerley | G06Q 30/02 |
| | | | 455/414.1 |
| 2009/0261951 A1* | 10/2009 | Chang | G06Q 30/0603 |
| | | | 340/10.1 |

(Continued)

OTHER PUBLICATIONS

"Information technology—Telecommunications and information exchange between systems—Near Field Communications—Interface and Protocol (NFCIP-1)," ISO/IEC 18092, pp. 1-66 (Apr. 1, 2004).

(Continued)

*Primary Examiner* — Michael J Sittner
(74) *Attorney, Agent, or Firm* — Jenkins, Wilson, Taylor & Hunt, P.A.

(57) ABSTRACT

The subject matter described herein includes methods, systems, and computer readable media for issuing and redeeming co-branded electronic certificates. In one example, a method includes receiving, via near field communication (NFC), a co-branded electronic certificate and an electronic payment card to conduct a wireless purchase transaction for at least one good or service. The method further includes determining whether qualification information contained in the co-branded electronic certificate matches at least a portion of the account number associated with the electronic payment card used to conduct the wireless purchase transaction. The method also includes applying the co-branded electronic certificate to conduct the purchase transaction if the qualification information matches the at least a portion of the account number.

14 Claims, 3 Drawing Sheets

(56) References Cited

U.S. PATENT DOCUMENTS

| | | | | |
|---|---|---|---|---|
| 2009/0271262 A1* | 10/2009 | Hammad | | 705/14 |
| 2009/0309711 A1* | 12/2009 | Adappa | | G06Q 30/02 |
| | | | | 340/501 |
| 2010/0241494 A1* | 9/2010 | Kumar | | G06Q 30/0207 |
| | | | | 705/14.1 |
| 2010/0257033 A1* | 10/2010 | Roberts | | G06Q 30/0229 |
| | | | | 705/14.3 |
| 2011/0047019 A1* | 2/2011 | Cervenka | | G06Q 30/0225 |
| | | | | 705/14.26 |

OTHER PUBLICATIONS

"Identification cards—Contactless integrated circuit(s) cards—Proximity cards—Part 2: Radio frequency power and signal interface," ISO/IEC 14443-2, pp. 1-10 (Jul. 22, 2003).

"Identification cards—Contactless integrated circuit(s) cards—Proximity cards—Part 4: Transmission protocol," ISO/IEC 14443-4, pp. 1-39 (Mar. 10, 2000).

"Identification cards—Contactless integrated circuit(s) cards—Proximity cards—Part 3: Initialization and anticollision," ISO/IEC 14443-3, pp. 1-48 (Jun. 11, 1999).

* cited by examiner

METHODS, SYSTEMS AND COMPUTER READABLE MEDIA FOR ISSUING AND REDEEMING CO-BRANDED ELECTRONIC CERTIFICATES

PRIORITY CLAIM

The present application claims the benefit of U.S. Provisional Patent Application Ser. No. 61/388,534, filed Sep. 30, 2010, the disclosure of which is incorporated herein by reference in its entirety.

TECHNICAL FIELD

The subject matter described herein relates to near field communication (NFC) and conducting wireless transactions using a mobile device. More particularly, the subject matter described herein relates to methods, systems, and computer readable media for issuing and redeeming co-branded electronic certificates.

BACKGROUND

Presently, the use of near field communication (NFC) enabled mobile devices by the general populace to conduct wireless payment transactions is steadily increasing. These wireless payment transactions frequently involve electronic coupons which may be stored in a mobile device and are generally used by customers without restriction or limitation. However, the unrestricted use of electronic coupons in all instances may not be desirable by merchants and manufacturers who wish to provide electronic coupons to a select group of customers in accordance with a particular business plan. For example, the unrestricted use of electronic coupons may prevent businesses, such as a credit card issuer and a manufacturer/retailer, that wish to strategically collaborate to offer a particular offer or coupon to a targeted customer in order to compel the purchase of a particular product with a particular payment card.

Accordingly, there exists a need for methods, systems, and computer readable media for issuing and redeeming co-branded electronic certificates.

SUMMARY

According to one aspect, the subject matter described herein includes methods, systems, and computer readable media for issuing and redeeming co-branded electronic certificates. In one embodiment, a method includes receiving, via near field communication (NFC), a co-branded electronic certificate and an electronic payment card to conduct a wireless purchase transaction for at least one good or service. The method further includes determining whether qualification information contained in the co-branded electronic certificate matches at least a portion of the account number associated with the electronic payment card used to conduct the wireless purchase transaction. The method also includes applying the co-branded electronic certificate to conduct the purchase transaction if the qualification information matches the at least a portion of the account number.

As used herein, the terms "wireless smart device" and "NFC enabled device" may be synonymous and are intended to refer to any device enabled with near field communication (NFC), radio frequency (RF) communication, or barcode capturing capabilities to interact with an NFC smart poster, a wireless device reader, or a wireless device writer with the corresponding technology. In one aspect, wireless device reader and/or writer may include a radio frequency (RF) reader and/or writer. One type of wireless device that can wirelessly communicate to a wireless smart device reader is an NFC card or NFC handheld device, including but not limited to a smart phone. In near field communication, a wireless smart device may communicate with a wireless transceiver or wireless device reader via inductive coupling of the reader antenna to the device antenna. The two loop antennas effectively form a transformer. The reader amplitude-modulates the radio frequency (RF) field to send information to the device. The device communicates with the transceiver and/or reader by modulating the loading on the device antenna, which also modulates the load on the reader antenna. In a wireless smart device, the NFC handset may enable contactless payment, and a security element (SE) for ensuring secure transactions may be embedded, provided by a universal subscriber identity module (USIM), or provided as an add-on to, for example, a SD or a jacket. Wireless smart devices may communicate with a transceiver or wireless device reader using NFC. As used herein, the term "wireless communication" includes communication conducted in accordance with the ISO 14443 and ISO 18092 standards. These specifications define communication protocols for wireless smart devices operating in close proximity with a reader antenna.

The subject matter described herein may be implemented in software in combination with hardware or in software in combination with hardware and firmware. For example, the subject matter described herein may be implemented in software executed by a hardware based processor. In one exemplary implementation, the subject matter described herein for issuing and redeeming co-branded electronic certificates may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
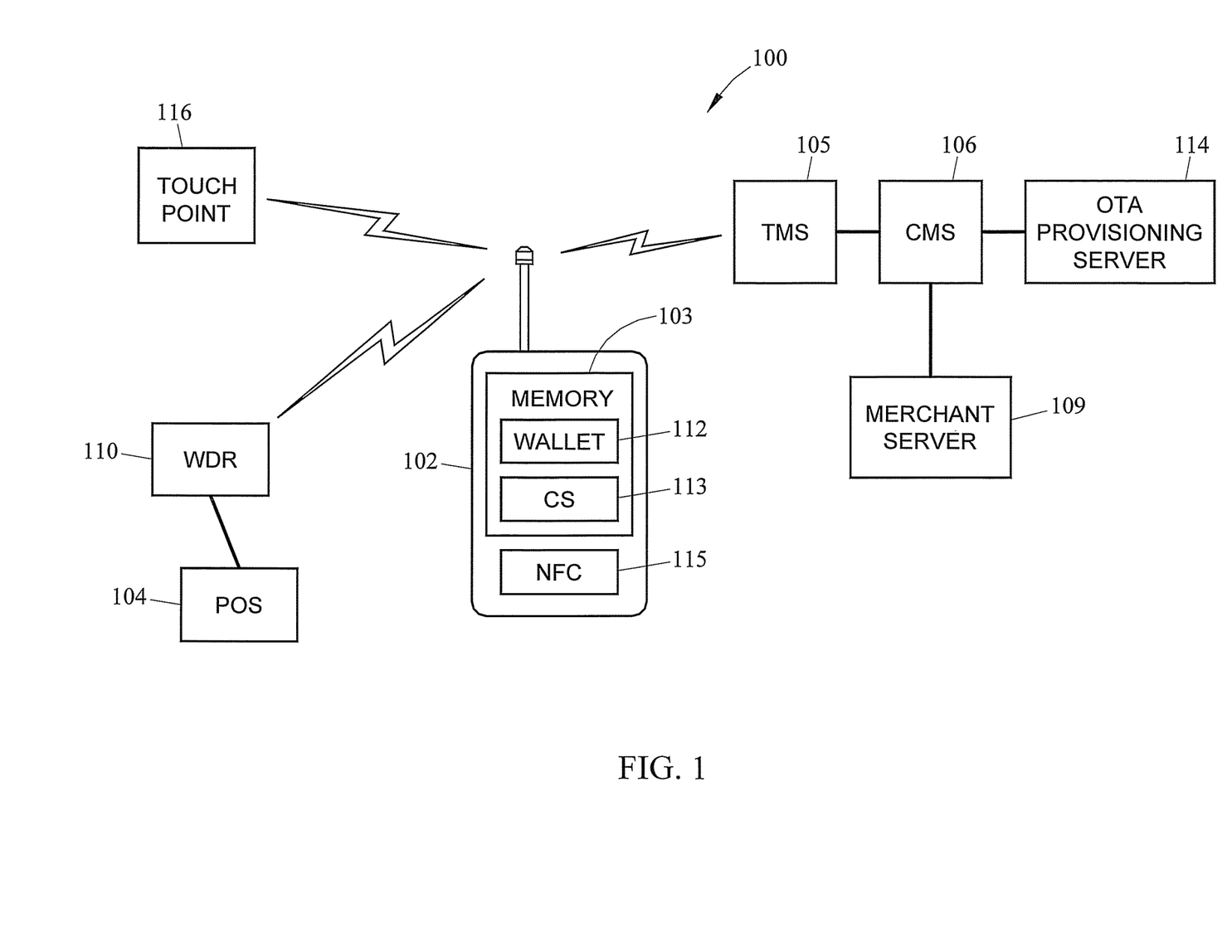
FIG. 1 is a block diagram illustrating an exemplary system for issuing and redeeming co-branded electronic certificates according to an embodiment of the subject matter described herein.

FIG. 1 is a block diagram of an exemplary system 100 for issuing and redeeming co-branded electronic certificates according to an embodiment of the subject matter described herein. As used herein, the term "co-branded electronic certificate" may refer to an electronic coupon, electronic offer, or electronic reward that is associated with two or more entities. For example, a co-branded electronic coupon may provide a discount off of a particular good or service associated with a merchant, manufacturer, retailer, and/or service provider. Notably, a co-branded electronic certificate may also include additional qualifying data (i.e., qualification data) that restricts the redeemer of the electronic coupon, offer, or reward to use a particular electronic financial card, payment card, or other electronic payment option (e.g., electronic credit card, debit card, check card, loyalty card, bank card, prepaid card) from a particular electronic card (e.g., soft card) issuer entity in order for the discount, reward, or offer to be applied to the purchase transaction of the particular good or service. Namely, the qualification data contained in the co-branded electronic certificate may be used to identify and/or verify a payment card issuer that serves as a co-branded partner (or an entity affiliated with the co-branded partner) of the merchant/retailer/manufacture of the good or service associated with the co-branded electronic certificate.

The aforementioned system 100 may comprise a plurality of components, which includes a near-field communication (NFC) enabled mobile device 102, at least one touch point 116, a trigger management server (TMS) 105, a content management server (CMS) 106, a point of sale (POS) terminal 104, a merchant server 109, a wireless device reader/writer 110, and an over the air (OTA) provisioning server 114. Although not shown, system 100 may also include other network elements that may be used to facilitate the issuing and redeeming of co-branded electronic certificates.

In one embodiment, a co-branded electronic certificate may be wirelessly "pushed" to mobile device 102 by a touch point 116 or wireless device reader/writer 110. In another embodiment, a user interfaces mobile device 102 with touch point 116 to obtain data used to acquire a co-branded electronic certificate. As used herein, a touch point may include any object or entity which can be utilized by a mobile device to request a co-branded electronic certificate advertised by or associated with the touch point. In one embodiment, a touch point may include an Internet advertisement, a smart poster, a barcode poster, a quick response (QR) code poster, a short code poster, an NFC device reader/writer, and the like. For example, a user may encounter a smart poster advertising a particular good or service that interests the user. The smart poster may include a smart tag (e.g., an NFC or RFID tag) that may be interfaced by an NFC enabled mobile device to obtain a co-branded electronic coupon associated with both the advertised good or service and a particular electronic card issuer. Generally, a smart poster is embodied as a sign, billboard, or any other form of advertising that incorporates a smart tag from which the user can extract smart tag identification information by interfacing NFC enabled mobile device 102 with the smart tag. Thus, the user may utilize NFC enabled mobile device 102 to interface with (e.g., tapped against or positioned in close proximity to) the smart tag on the smart poster to obtain information that can be used to request the co-branded electronic certificate.

For example, TMS 105 may be configured to receive an electronic certificate request from a mobile device after being interfaced with a touch point. In one embodiment, the interfacing between a mobile device and touch point includes tapping an NFC enabled mobile device with a smart tag on a smart poster. As used herein, an NFC enabled mobile device (e.g., mobile device 102) may comprise a mobile phone with an NFC module 115 that includes embedded NFC support circuitry/software, which enables a user to wirelessly communicate with NFC enabled devices, such as a smart poster. In one embodiment, NFC module 115 may include universal subscriber identification module (USIM)/USIM integrated circuit card (UICC) NFC support circuitry and/or software to wirelessly communicate with the touch points and wireless device readers/writers. In one embodiment, NFC module 115 may include SDiO based NFC support circuitry and/or software to wirelessly communicate with the touch points.

In one embodiment, NFC enabled mobile device 102 may utilize NFC module 115 to acquire or "pull" data (e.g., a content location code) from a passive smart tag of a smart poster. After interfacing with the smart poster, mobile device 102 may initiate a wallet application 112 (e.g., a software client such as a midlet client application program that is executed by a mobile phone processor) which is responsible for transmitting content location code (CLC) information and customer identification information to TMS 106. For example, the midlet may send the CLC information to TMS 106 to request the selected advertised co-branded electronic coupon. In one embodiment, the CLC information includes data related to both co-branded merchant identification information (i.e., information identifying the merchant/manufacturer/service provider of a product/service and information identifying a credit card issuer) and content location information that indicates the location of the co-branded certificate content data.

In one embodiment, TMS 105 receives the co-branded electronic certificate request from wallet application 112. TMS 105 may use the CLC contained in the request to determine the appropriate content management server (CMS) that is communicatively connected to the merchant server responsible for hosting the desired co-branded coupon data (e.g., co-branded electronic certificate content data) advertised by smart poster 116. In one embodiment, the co-branded electronic certificate content includes encoded additional qualifying information (i.e., "qualification information") that specifies certain conditions, restrictions, and/or limitations that are to be satisfied in order to redeem the co-branded electronic certificate during a purchase transaction. For example, the qualification information may include a predefined number of the first few digits of an electronic payment card account number (e.g., an electronic credit card number) that needs to be used to apply the co-branded electronic coupon to the purchase the good/service.

In one embodiment, the qualification information included in the co-branded electronic certificate content data may include the first six digits of an account number associated with an electronic payment card (e.g., an electronic credit card, an electronic debit card, an electronic merchant card, an electronic prepaid card, an electronic loyalty card, and the like). This qualification information is ultimately encoded in a provisioned co-branded electronic certificate. For example, the co-branded electronic certificate may include a designated field or area (which is accessible to a wireless device reader during an NFC session) that contains six digits corresponding to a particular issuer identification number (IIN). Notably, each unique IIN may be allocated to a particular card issuer. If the qualification information of the co-branded electronic certificate only includes a particular IIN, then the co-branded electronic certificate may be restricted for use by a particular group of cardholders (e.g., a co-branded electronic coupon may only be used by VISA cardholders). In one embodiment, the electronic card issuer may include any one of a merchant card issuer, a payment card issuer, a service provider card issuer, and the like.

In an alternate embodiment, the co-branded electronic certificate may include a designated field or area that contains a plurality of digits corresponding to an entire ISO/IEC 7812 account number. In one embodiment, the ISO/IEC 7812 account number comprises a multi-digit account number that includes 1) a six digit UN, 2) an individual account number that includes up to a maximum of 12 digits (beginning at the seventh digit) and, occasionally, 3) a final digit that is used for a check digit (e.g., to be used in a Luhn algorithm). If the additional qualifying information of the co-branded electronic certificate includes an entire ISO/IEC 7812 account number, then the co-branded electronic certificate may be restricted for use by a particular cardholder (e.g., a co-branded electronic coupon may only be used by a cardholder of a particular electronic payment card associated with the ISO/IEC individual account number).

After the co-branded electronic certificate content data is located and accessed by merchant server 109 (e.g., cross-referencing the CLC to a local or external data storage that maps CLCs with co-branded electronic certificate content data), merchant server 109 provides the co-branded certificate content data to mobile device 102 directly or via OTA provisioning server 114 and/or CMS 106. For example, merchant server 109 may prepare the co-branded electronic certificate content data (e.g., the discount amount for the particular product, the qualification information, a designated protocol, the specified encryption and authentication information, and the like) and forwards the prepared content to OTA provisioning server 114 (or an IP provisioning server or Direct provisioning server). OTA provisioning server 114 may include any server that is responsible for issuing electronic certificates to mobile devices (e.g., NFC mobile device 102) per the instructions and information received from CMS 106 or any other network element in system 100. The functions provided by OTA provisioning server 114 may include providing OTA administrative services for the secure element on a mobile device, and providing a secure local provisioning point for issuing electronic certificates to a mobile device. In one embodiment, OTA provisioning server 114 may be embodied as a plurality of servers as opposed to a single stand-alone server as shown in FIG. 1. In one embodiment, the OTA interface protocol used by OTA provisioning server 114 and a mobile device with wireless communications capabilities may vary with the device. Examples of OTA interface protocols that may be used include IP related protocols, WiFi, GSM, GPRS, CDMA, Bluetooth, BIP (Bearer Independent Protocol), SMS PP, and the like.

Once the co-branded electronic certificate data is received, mobile device 102 may use the co-branded electronic certificate data to provision the co-branded electronic certificate. In one embodiment, the co-branded electronic certificate may be stored in a certificate storage element 113, which may include either a secure memory element or non-secure baseband memory. A consumer may subsequently use wallet application 112 to present the co-branded electronic certificate at the point of sale (e.g., at POS terminal 104 or wireless device reader 110) during a purchase transaction for a good/service associated by the co-branded electronic certificate. During the purchase transaction, the wireless device reader 110 at the point of sale may be configured to only redeem the co-branded electronic coupon, offer, and/or reward if the purchase is made using an electronic payment card (e.g., an electronic credit card/bank card/check card) that is indicated by the aforementioned additional qualifying information (i.e., "qualification information").

In one embodiment, during a purchase transaction, wireless device reader 110 receives a co-branded electronic coupon and an electronic payment card via NFC from mobile device 102 and conducts a verification process. For example, wireless device reader 110 may access the qualification information that is encoded in designated field of the co-branded electronic coupon. As mentioned above, the qualification information may include at least a portion of the customer's payment card account number, such as the IIN or a bank identification number (BIN) of the customer's electronic credit card. Wireless device reader 110 may then store the qualification information until the payment card, such as an electronic credit card, is provided to wireless device reader 110 (e.g., if the electronic payment card information is not provided/presented concurrently with the co-branded electronic coupon during the payment transaction). After both the electronic payment card information and co-branded electronic coupon information is acquired, wireless device reader 110 may access and compare the qualification information encoded in the co-branded electronic coupon with at least a portion of the electronic payment card account number, for example, the first six digits of the customer's payment card (e.g., the first six numbers of the IIN). If wireless device reader 110 determines a valid match of the two numbers/digits, then wireless device reader verifies that the co-branded electronic coupon is valid and proceeds to process the purchase transaction using both the co-branded electronic coupon and the associated electronic payment card.

Figure 2:
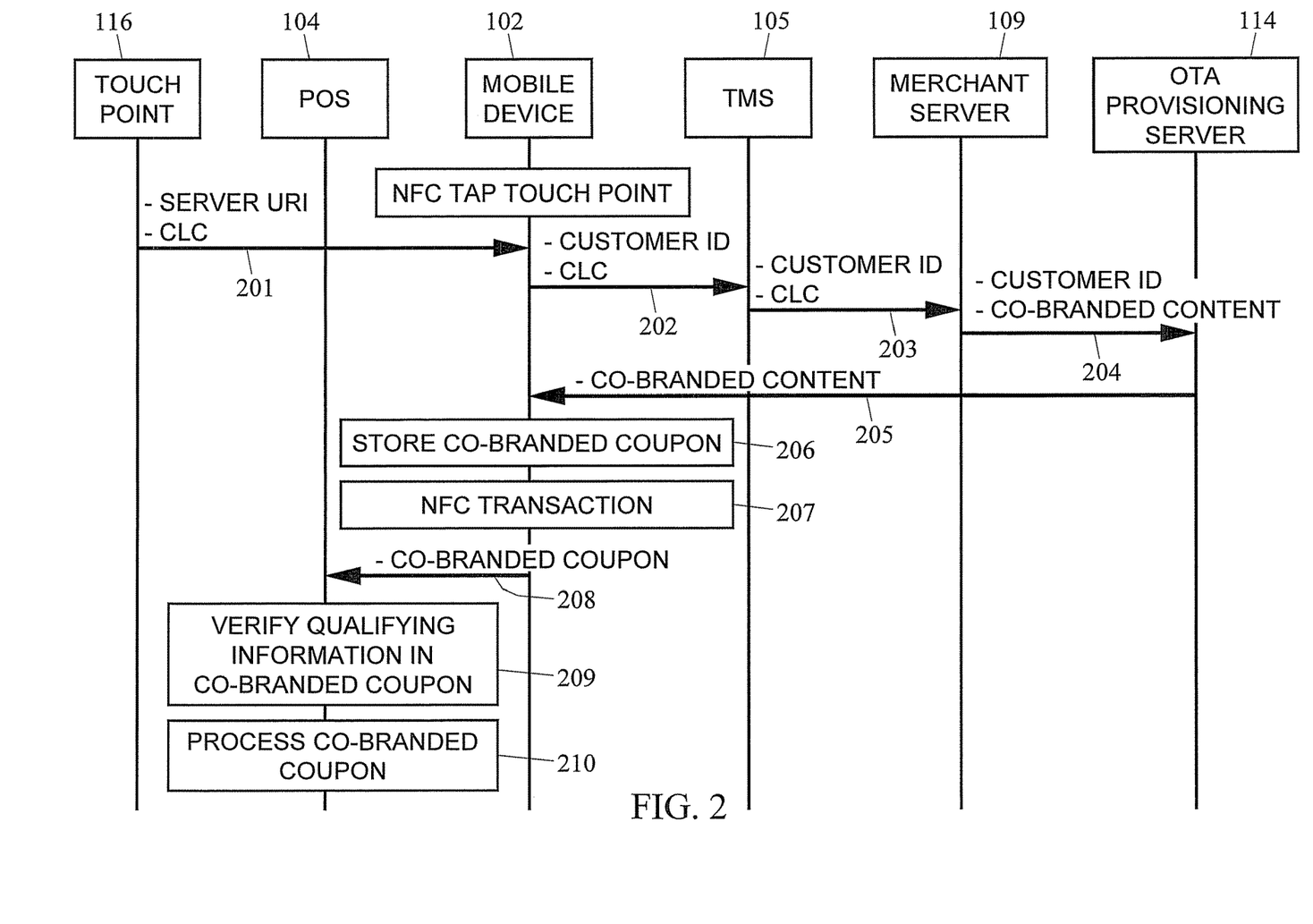
FIG. 2 is a signal flow diagram illustrating an exemplary signaling sequence for issuing and redeeming co-branded electronic certificates according to an embodiment of the subject matter described herein.

FIG. 2 depicts an exemplary signaling sequence for issuing and redeeming co-branded electronic certificates according to an embodiment of the subject matter described herein. For example, mobile device 102 may be used to interface with touch point 116 via an NFC tap. In one embodiment, touch point 116 may include a smart poster that advertises a $10 off co-branded electronic coupon that may be applied to the purchase of a shirt sold at Clothing Store X if a customer uses Bank ABC's credit card to conduct the purchase transaction. In response to the NFC tap, mobile device 102 receives a signal 201 containing a server address identifier (e.g., a URI of TMS 105) and a content location code (CLC). In one embodiment, a CLC includes a code that may be used to locate content data associated with the advertised co-branded electronic coupon.

Upon receiving the information contained in message 201, mobile device 102 uses the receive URI address information to send data to TMS 105. For example, mobile device 102 may use the URI address associated with TMS 105 to send a signal 202 containing a customer identifier and the CLC to TMS 105. TMS 105 may then utilize the CLC to access a local or external database (e.g., that cross-references CLCs with merchant server addresses/locations) to determine the proper merchant server 109 associated with the co-branded electronic coupon. After determining the appropriate merchant server 109, TMS 105 forwards the customer identifier and the CLC to merchant server 109 via signal 203. Merchant server 109 then uses the CLC to obtain (e.g., in a local or external database storage) the co-branded electronic coupon content data. Notably, the co-branded electronic coupon content data may include information such as the discount amount applied to a purchase transaction of the advertised good or service and qualification information. As mentioned above, the qualification information may include at least a portion of an account number corresponding to a customer payment card needed to apply the co-branded electronic coupon to the purchase transaction.

Merchant server 109 may then forward, via signal 204, the co-branded electronic coupon content data and the customer identifier (e.g., phone number of mobile device 102) to an OTA provisioning server 114 (via signal 204), which in turn uses the customer identifier to wirelessly send the co-branded content to mobile device 102 (via signal 205). In one embodiment, signal 204 is sent to server 114 via a CMS (not shown). Upon receiving the co-branded electronic coupon content data, mobile device 102 may provision and/or store the co-branded electronic coupon as a co-branded electronic coupon in its memory 103, which may comprise a secure element (block 206). Alternatively, the co-branded coupon may be stored by mobile device 102 in non-secure baseband memory (e.g., as may be the case for lower value coupons). Afterwards, mobile device 102 may be used to conduct an NFC purchase transaction for the shirt associated with the stored co-branded electronic coupon and originally advertised by the smart poster (block 207). In one embodiment, mobile device 102 may be used to conduct an NFC purchase transaction by presenting the co-branded electronic coupon and an electronic payment card (e.g., Bank ABC's credit card) to a wireless reader device at POS 104. Upon conducting the NFC purchase transaction, the wireless device reader receives the co-branded coupon via signal 208 and reads the qualification information that is encoded in the co-branded electronic coupon. Similarly, the wireless device reader also receives the payment card information and reads the account number information that is encoded in the electronic payment card. If the wireless device reader determines that the additional qualifying information (i.e., qualification information) matches at least a portion of the account number of the electronic payment card (e.g., the first six digits, the entire account number, etc.), then the co-branded electronic coupon is verified (block 209).

Thus, the wireless device reader may then apply the $10 discount of the co-branded electronic coupon discount to the purchase transaction. In an alternate embodiment, the verification process may be conducted by a merchant computer/server that is communicatively connected to the wireless device reader, such as computer or server located at the point of sale or a backend server in the cloud.

Figure 3:
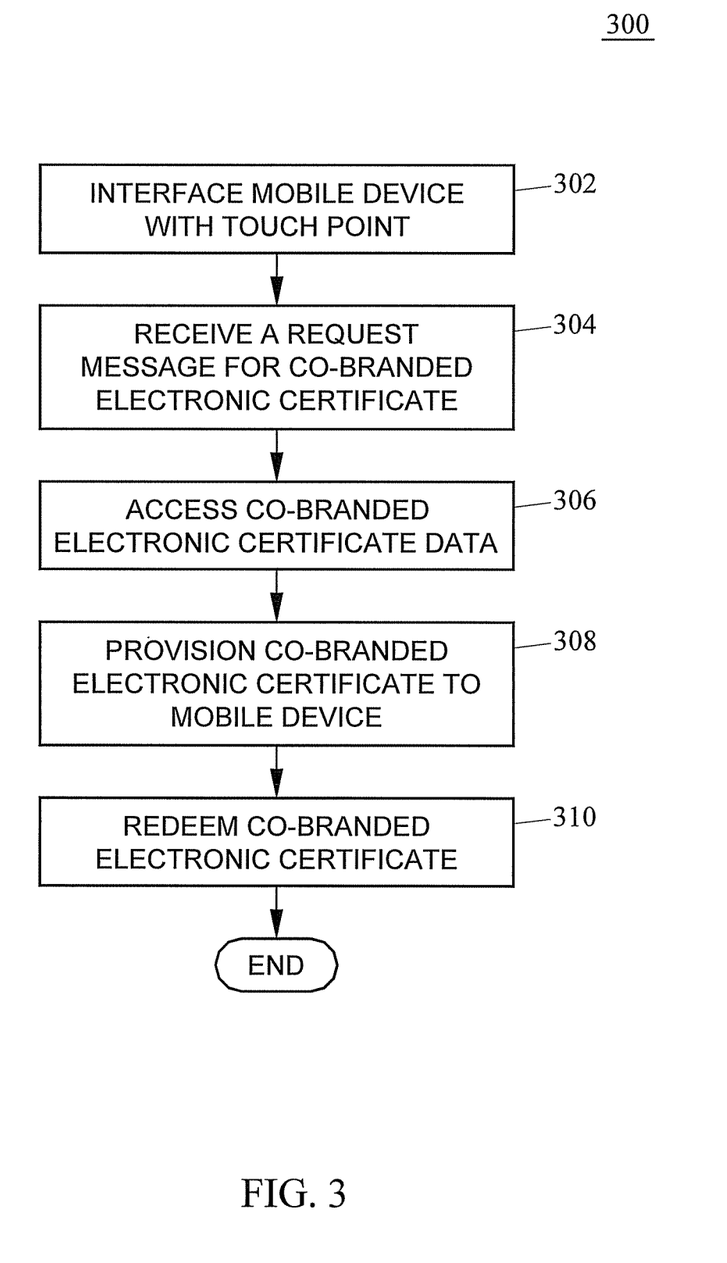
FIG. 3 is a flow chart illustrating an exemplary method for issuing and redeeming co-branded electronic certificates according to an embodiment of the subject matter described herein.

FIG. 3 depicts a flow chart of an exemplary method 300 for issuing and redeeming co-branded electronic certificates. In block 302, a mobile device is interfaced with a touch point. In one embodiment, an NFC enabled mobile device is NFC tapped with a smart poster advertising a co-branded electronic coupon or offer for a particular good or service. Notably, the co-branded electronic coupon may be redeemed (or offer may be applied) to the purchase transaction for the particular product if a particular electronic purchase card is used. In one embodiment, the smart poster and/or the provisioned co-branded electronic certificate (as displayed on the mobile device) may visually indicate the requisite payment card to be used.

In block 304, a request message for the co-branded electronic certificate is received. In one embodiment, a TMS may receive a request message from the NFC enabled mobile device that was used to interface with the smart poster. Notably, the smart poster includes a smart tag that contained a URI address that was used by the NFC enabled mobile device to direct the request message to the TMS. In one embodiment, the request message includes a CLC and a customer identifier (e.g., the phone number of the customer's mobile device). Ultimately, the TMS forwards the request message to the appropriate merchant server (as indicated by the CLC) that is supporting the co-branded electronic certificate data.

In block 306, the co-branded electronic certificate is accessed. In one embodiment, the merchant server may use the CLC to access an associated database in order to obtain the appropriate co-branded electronic certificate content data.

In block 308, the co-branded electronic certificate is provisioned to the mobile device. In one embodiment, the merchant server forwards the customer identifier and the co-branded electronic certificate content data to an OTA provisioning server (e.g., directly or via a CMS). The OTA provisioning server then wirelessly transmits the co-branded electronic certificate content data to mobile device 102 using the customer identifier. Mobile device 102 may then utilize the received co-branded electronic certificate data to provision and store a corresponding co-branded electronic certificate.

In block 310, the co-branded electronic certificate is redeemed. In one embodiment, a customer selects the appropriate product for purchase at a store location and presents the product to a point of sale (e.g., a cash register). Mobile device 102 may be used at the point of sale to interface with a wireless device reader. In one embodiment, mobile device 102 presents the electronic co-branded certificate and an electronic payment softcard to the wireless device reader. The wireless device reader may then read the encoded qualification information of the electronic co-branded certificate and determine if the qualification information matches at least a portion of the account number associated with the presented electronic payment card. If a match of the two numbers/digits is verified, then the wireless device reader may apply the discount or offer associated with the co-branded electronic certificate to the purchase transaction of the presented product.

One example of how the present subject matter may be used is also illustrated by the following scenario. A consumer may encounter a smart poster that advertises a co-branded electronic coupon that offers a $1 discount off of a particular soda drink. The smart poster may be displayed by a particular bank or credit card issuer that is offering the co-branded electronic coupon in order to invite consumers to use their credit card to purchase the advertised good/service or other goodwill purposes. Once the consumer interfaces the NFC enabled mobile device with the smart poster, the mobile device may obtain the co-branded electronic coupon that is associated with both the aforementioned particular soda product and the particular credit card issuer. At this time or anytime thereafter, the consumer may attempt to redeem the electronic coupon. In order to redeem the electronic coupon, the consumer will need to present the co-branded electronic coupon at a POS and 1) make a purchase transaction for the particular soda product, and 2) conduct the purchase transaction using the particular type of credit card, bank card, check card, etc. that is specified by the additional qualifying information in the co-branded electronic coupon. If either of these conditions are not met at the time of purchase (e.g., an alternative good is purchased or a different credit card is used), then the co-branded electronic coupon will not be able to be redeemed. If both conditions are met at the time of purchase, then the discount afforded by the co-branded electronic coupon will be applied to the purchase transaction. The POS terminal or wireless device reader may also be configured to perform any necessary authentication and qualification checks to verify the authenticity of the co-branded electronic certificate prior to conducting the purchase transaction.

In one embodiment, mobile device 102 the co-branded electronic certificate may include at least one visual notification that indicates the brands associated with a merchant, retailer, manufacturer, service provider, merchant card issuer, payment card issuer, loyalty card issuer, bank card issuer, credit card issuer, and the like. For example, the co-branded electronic certificate may be displayed on a mobile device's screen as an icon including a brand symbol corresponding to the product brand and the card issuer brand. In an alternate embodiment, the visual notification of the associated payment card (to be used with the co-branded electronic certificate) may include text that indicates a message such as "sponsored by CARD ISSUER X" on the co-branded electronic certificate as displayed on a mobile device screen.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for redeeming a co-branded electronic certificate, the method comprising:
   sending, to a trigger management system (TMS) by a wallet application in a mobile device, a request for a co-branded electronic coupon that includes customer identification information and content location code (CLC) information, wherein the CLC information within the request includes a code that is used to locate content data associated with the co-branded electronic coupon and is obtained by the mobile device from a smart tag of a smart poster in response to proximally positioning the mobile device to the smart poster;
   utilizing, by the TMS, the CLC information to identify an address of a merchant server responsible for obtaining the content data comprising a qualification number identifying a particular brand of an electronic payment card that is required to be used together with the co-branded electronic coupon in a wireless purchase transaction at a wireless reader device in order for the co-branded electronic coupon to be applied to the wireless purchase transaction and further restricts the use of the electronic coupon to a particular group of electronic payment cardholders that use the electronic payment card issued by the payment card issuer entity;
   providing, by the merchant server via an over the air (OTA) provisioning server, the content data to the mobile device;
   provisioning, by the mobile device, the received content data as the co-branded electronic coupon that contains the qualification information in the mobile device;
   receiving, by a wireless device reader via near field communication (NFC) from the mobile device, a presentation of both the co-branded electronic coupon and the electronic payment card to conduct a wireless purchase transaction at the wireless device reader for at least one good or service, wherein the electronic payment card is issued by a payment card issuer entity that is a different entity than a merchant entity associated with providing the content data to the mobile device;
   determining, by the wireless device reader, whether the qualification number contained in the received co-branded electronic coupon matches at least a portion of an account number of the electronic payment card used to conduct the wireless purchase transaction at the wireless device reader; and
   redeeming, by the wireless device reader, the co-branded electronic coupon during the wireless purchase transaction conducted at the wireless device reader if the qualification number read by the wireless device reader matches the at least a portion of the account number of the electronic payment card presented at the wireless device reader.

2. The method of claim 1 wherein the encoded qualification number includes at least one of: an issuer identification number (IIN), a bank identification number (BIN), and an ISO/IEC 7812 account number.

3. The method of claim 1 wherein redeeming the co-branded electronic coupon includes applying a co-branded electronic coupon discount to the wireless purchase transaction.

4. The method of claim 1 wherein the mobile device is a near field communication (NFC) enabled mobile device.

5. The method of claim 1 wherein the co-branded electronic certificate includes at least one of: a co-branded electronic coupon, a co-branded electronic reward, and a co-branded electronic offer.

6. The method of claim 1 wherein the co-branded electronic certificate is visually displayed on the screen of the mobile device with two or more brands.

7. The method of claim 6 wherein the two or more brands includes at least one of: a product brand, a payment issuer brand, a merchant brand, and a services brand.

8. A system for redeeming a co-branded electronic certificate, the system comprising:
   a mobile device configured to send, by a wallet application in the mobile device, a request for a co-branded electronic coupon that includes customer identification information and content location code (CLC) information, wherein the CLC information within the request includes a code that is used to locate content data associated with the co-branded electronic coupon and is obtained by the mobile device from a smart tag of a smart poster in response to proximally positioning the mobile device to the smart poster;
   a trigger management system (TMS) configured to receive the request for the co-branded electronic coupon, to utilize the CLC information to identify an address of a merchant server responsible for obtaining the contend data comprising a qualification number identifying a particular brand of an electronic payment card that is required to be used together with the co-branded electronic coupon in a wireless purchase transaction at a wireless reader device in order for the co-branded electronic coupon to be applied to the wireless purchase transaction and further restricts the use of the electronic coupon to a particular group of electronic payment cardholders that use the electronic payment card issued by the payment card issuer entity;
   a merchant server configured to provide the content data to the mobile device via an over the air (OTA) provisioning server, wherein the mobile device subsequently provisions the received content data as the co-branded electronic coupon that contains the qualification information in the mobile device; and
   a wireless device reader configured to receive, via near field communication (NFC) from the mobile device, a presentation of both the co-branded electronic coupon and the electronic payment card to conduct a wireless purchase transaction at the wireless device reader for at least one good or service, wherein the electronic payment card is issued by a payment card issuer entity that is a different entity than a merchant entity associated with providing the content data to the mobile device, to determine whether the qualification number contained in the co-branded electronic coupon matches at least a portion of the account number of the electronic payment card used to conduct the wireless purchase transaction at the wireless device reader, and to redeem the co-branded electronic coupon during the wireless purchase transaction conducted at the wireless device reader if the qualification number read by the wireless device reader matches the at least a portion of the account number of the electronic payment card presented at the wireless device reader.

9. The system of claim 8 wherein the encoded qualification number includes at least one of: an issuer identification number (IIN), a bank identification number (BIN), and an ISO/IEC 7812 account number.

10. The system of claim 8 wherein the co-branded electronic certificate includes a co-branded electronic coupon discount to be applied to the wireless purchase transaction.

11. The system of claim 8 wherein the mobile device is a near field communication (NFC) enabled mobile device.

12. The system of claim 8 wherein the co-branded electronic certificate includes at least one of: a co-branded electronic coupon, a co-branded electronic reward, and a co-branded electronic offer.

13. The system of claim 8 wherein the co-branded electronic certificate is visually displayed on the screen of the mobile device with two or more brands.

14. The system of claim 13 wherein the two or more brands includes at least one of: a product brand, a payment issuer brand, a merchant brand, and a services brand.

* * * * *